US005780854A

United States Patent [19]

Lin

[11] Patent Number: 5,780,854

[45] Date of Patent: Jul. 14, 1998

[54] STRUCTURE FOR AN INFRARED PHOTOELECTRIC DEVICE

[76] Inventor: Edward Lin, 1F, 359 Chung-Yang N. Road, Sec. 2, Pei-Tou, Taipei, Taiwan

[21] Appl. No.: 870,620

[22] Filed: Jun. 6, 1997

Related U.S. Application Data

[63] Continuation-in-part of Ser. No. 583,717, Jan. 5, 1996, abandoned.

[51] Int. Cl.[6] .................. G01J 5/04; G01J 5/08; G08B 13/02

[52] U.S. Cl. .................. 250/338.1; 250/347; 250/353; 250/504 R

[58] Field of Search .................. 250/342, 353, 250/DIG. 1, 347, 341.1, 341.8, 493.1, 504 R, 522.1, 221; 340/555, 556, 557

[56] References Cited

U.S. PATENT DOCUMENTS

| | | | |
|---|---|---|---|
| 3,653,021 | 3/1972 | Litman et al. | 340/556 |
| 4,650,989 | 3/1987 | Frigon | 250/221 |
| 4,757,204 | 7/1988 | Baldwin et al. | 250/DIG. 1 X |
| 4,942,385 | 7/1990 | Kobayashi et al. | 250/221 X |
| 4,967,069 | 10/1990 | Yamakawa | 250/221 |
| 5,138,150 | 8/1992 | Duncan | 250/221 |

FOREIGN PATENT DOCUMENTS

| | | | |
|---|---|---|---|
| 53-79400 | 7/1978 | Japan | 340/556 |

*Primary Examiner*—Edward J. Glick

*Attorney, Agent, or Firm*—Beveridge, DeGrandi, Weilacher & Young LLP

[57] ABSTRACT

A structure for an infrared photoelectric device including a casing covered by a face panel, a circuit board with an infrared photoelectric element, a lens disposed above the circuit board, an adjusting frame assembly mounted inside the casing to hold the circuit board and the lens, and a switch mounted in a top recess on the casing and connected to an alarm system. The adjusting frame assembly is connected to the inside of the casing by a ball and socket joint. The adjusting frame assembly is then fixedly secured at the desired angle by a locating plate. The switch is switched on to turn on the alarm system when the power supply is cut off from the circuit board or the outer cover of the junction box in which the device is installed is opened by a burglar or intruder.

10 Claims, 4 Drawing Sheets

STRUCTURE FOR AN INFRARED PHOTOELECTRIC DEVICE

This present application represents a continuation-in-part of U.S. patent application Ser. No. 08/583,717 filed on Jan. 5, 1996, now abandoned, which, in its entirety, is incorporated herein by reference.

BACKGROUND OF THE INVENTION

The present invention relates to the structure around an infrared photoelectric device. The projecting angle for an infrared photoelectric device is easily adjusted during installation of the device. The structure includes a switch that will automatically trigger an attached alarm system when either the power is disconnected to the circuit board or the cover is damaged by a burglar or other intruder.

FIG. 4 shows a conventional infrared photoelectric emitter comprising a casing 01, a circuit board 02, a lens 03, a reflector 04, and a cover 05. The circuit board 02 and the lens 03 are mounted within the casing 01. A four-way adjusting frame 06 is mounted in the casing 01 adjacent to the lens 03 to hold the reflector 04. The four-way adjusting frame 06 can be adjusted to change the angular position of the reflector 04, which reflects the infrared light passing from the circuit board 02 through the lens 03 onto a separate infrared receiver (not shown). The adjusting frame 06 is made from metal by stamping. The adjusting frame 06 has two substantially U-shaped plates 061 connected together and then fixed to the casing 01 by screws 062. This adjusting frame 06 is complicated to install and its cost of manufacturing is high as a result. When installed, the U-shaped plates 061 tend to shift or move which alters the direction and angle of the emitted infrared. Furthermore, the alarm control switch of this structure for an infrared photoelectric emitter has two signal lines 071 respectively fixed to two metal contacts 012 at the top of a respective female screw 011. The cover 05 has a metal plate 051 on the inside, and two mounting holes 052 through the metal plate 051. By threading two screws 08 into the mounting holes 052 and the female screws 011, the cover 05 is fixed to the casing 01. When installed, the signal lines 071 are connected by the metal plate 051. However, a burglar can use a tool to touch the metal plate 051 and the metal contacts 012 through the mounting holes 052 to provide a continuous connection between the metal plate 057 and the metal contacts 012. Therefore, the infrared photoelectric emitter can be easily destroyed without triggering the alarm control switch by inserting a tool through one or both of the mounting holes 052 to provide a continuous connections between the metal plate 051 and the metal contacts 012.

SUMMARY OF THE INVENTION

It is one object of the present invention to provide an infrared photoelectric device which can be conveniently adjusted to a desired and fixed infrared projecting angle. It is another object of the present invention to provide an infrared photoelectric device which has an alarm control switch that will be automatically switched on to activate an alarm system when the power supply is disconnected from the circuit board or the cover is damaged by a burglar or other intruder.

According to one aspect of the present invention, the infrared photoelectric device includes a casing covered by a face panel, a circuit board with an infrared photoelectric element, a lens disposed above the circuit board, and an adjusting frame assembly mounted inside the casing to hold the circuit board and the lens. The casing includes a half-round recess on the inside. The adjusting frame assembly includes a connecting device which has a ball resting in the half-round recess of the casing with a square projecting rod extending from the ball, a locating plate fixed to the inside of the casing by fastening elements to hold down the ball of the connecting device in the half-round recess of the casing which has a center hole to surround the square projecting rod of the connecting device and a convex portion around the center hole and fitting over the ball, a rack having a square bottom hole coupled to the square projecting rod of the connecting device. The circuit board is connected to a plurality of top circuit board support extending from said rack. The lens is connected to a plurality of top upright posts extending from said rack.

According to another aspect of the present invention, a switch is mounted within a recess at the top side of the casing, which is connected to an alarm system. The switch is switched on to turn on the alarm system if either the power is interrupted to the circuit board or the cover board of the junction box holding the invention is opened up by an intruder.

DETAILED DESCRIPTION OF THE PREFERRED EMBODIMENT

Figure 1:
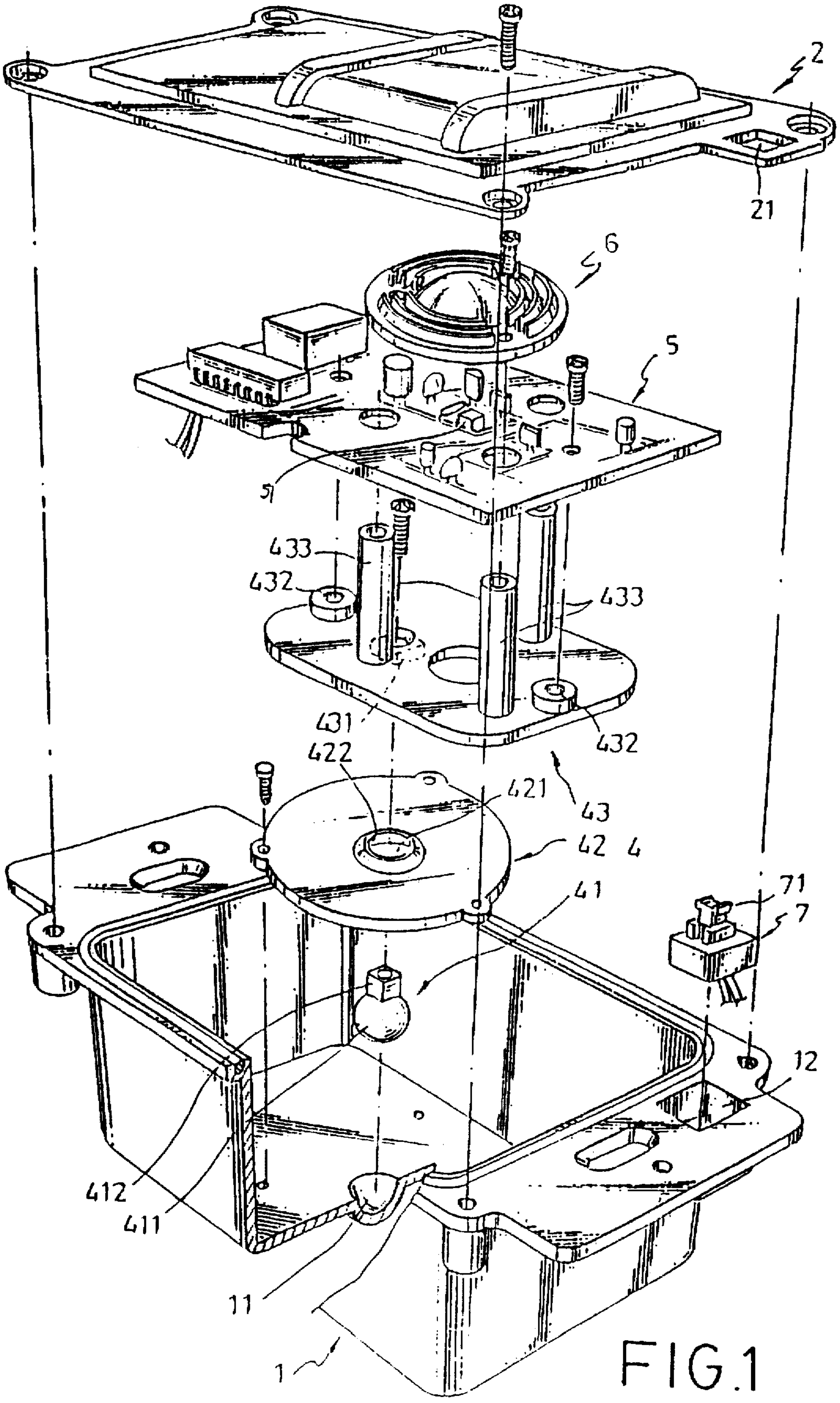
FIG. 1 is an exploded view of the structure for an infrared photoelectric device according to the present invention.
Figure 2:
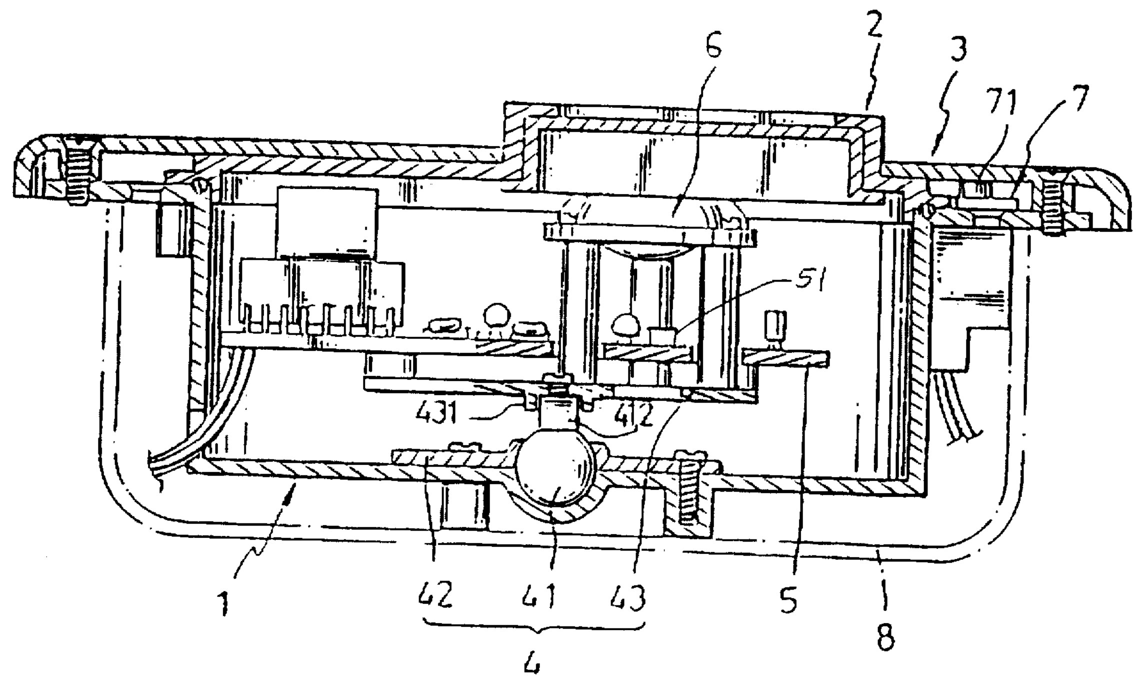
FIG. 2 is a sectional assembly view of the infrared photoelectric device shown in FIG. 1.
Figure 3:
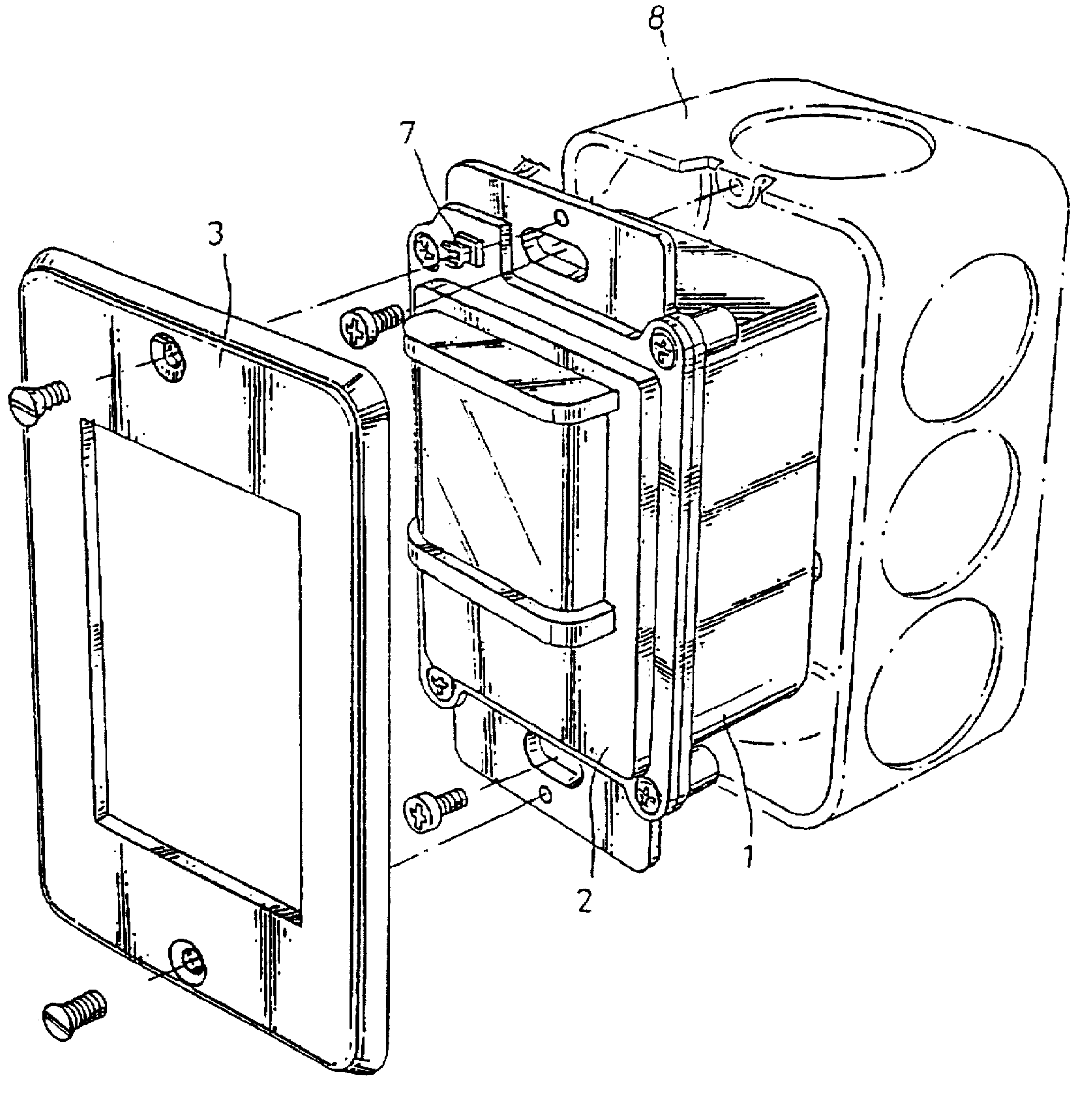
FIG. 3 is an installed view of the present invention.
Figure 4:
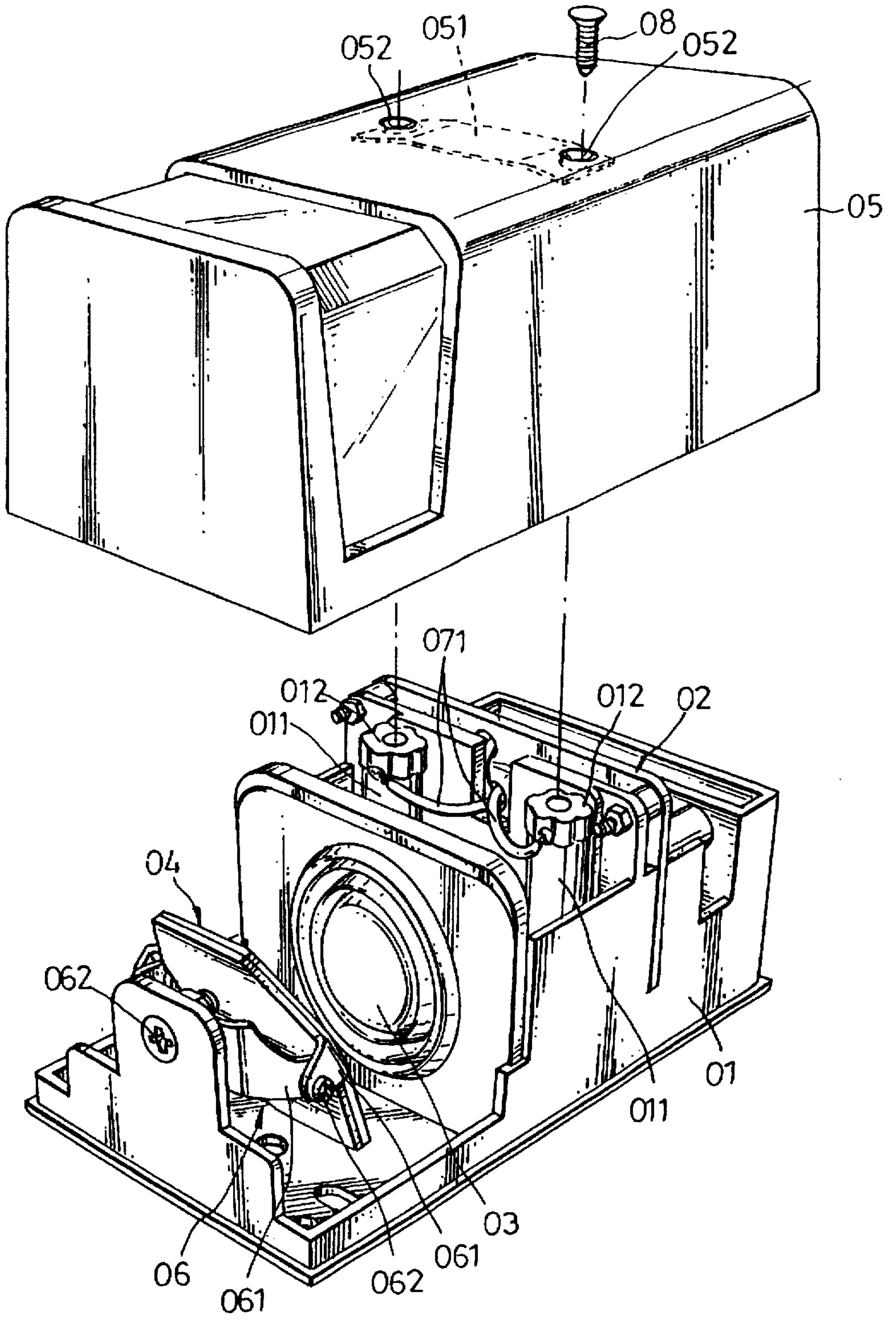
FIG.4 PRIOR ART
FIG. 4 shows an infrared photoelectric emitter according to the prior art.

Referring to FIGS. 1–3, a structure for an infrared photoelectric device in accordance with the present invention generally includes a casing 1, a face panel 2, a cover board 3, an adjusting frame assembly 4, a circuit board 5, and a lens 6. The casing 1 can be mounted within a regular electric junction box 8. The adjusting frame assembly 4 is mounted within the casing 1. The circuit board 5 and the lens 6 are fixed to the adjusting frame assembly 4 and covered by the cover board 3.

The casing 1 includes a half-round recess 11 on the inside. The adjusting frame assembly 4 includes a connecting device 41, a locating plate 42, and a rack 43. The connecting device 41 includes a ball 411 that rests within the half-round recess 11 inside the casing 1. The ball 411 has a square projecting rod 412 raised from it. The locating plate 42 is fixedly secured to the inside of the casing 1 and covers the ball 411 of the connecting device 41. The locating plate 42 has a center through hole 421 for passing the square projecting rod 412, and a convex portion 422 disposed around the center through hole 421 and fitting over the ball 411 of the connecting device 41. The rack 42 includes a square bottom recess (or hole) 431 fastened to the square projecting rod 412 of the connecting device 41, and a plurality of circuit board supports 432 and a plurality of lens mounting posts 433 rising from the top side of the rack 42. The circuit board 5 with a infrared photoelectric element 51 (shown as a black box) is fixedly secured to the circuit board supports 432 by screws. The lens 6 is fixed to the lens mounting posts 433 by screws. During the assembly process, the rack 43 is adjusted to the desired angular position, and then the locating plate 42 is fixed in place with screws to hold the connecting device 4 in position. Therefore, the projecting angle for the infrared is fixed when the infrared photoelectric device is installed.

The circuit board 5 holds the infrared photoelectric element 51 that the structure of this invention protects and provides an angle of coverage. The infrared photoelectric element 51 may be an emitter consisting of a photodiode, infrared emitting diode or triode. The circuit board 5 is designed to have the necessary circuitry to operate the emitter or any other photoelectric element type. Consequently, the circuit board will have the associate circuitry to accompany an emitter. The lens provides the necessary focusing for the infrared light produced by the emitter.

The second embodiment is a casing 1 that includes a top recess 12 for mounting a switch 7, and the face panel 2 has an opening 21 corresponding to the top recess 12 of the casing 1. When the switch 7 is mounted within the top recess 12 of the casing 1, the face panel 2 is covered on the casing 1 to hold down the switch 7 in place. When assembled, the press button 71 of the switch 7 projects out of the opening 21 of the face panel 2. When the infrared photoelectric device is installed, the press button 71 is held in a depressed position by the cover board 3, and the switch 7 is turned off. When the power supply is cut-off to the circuit board 5 or the press button 71 is released due to the removal of the cover board 3 from the casing 1, the switch 7 is turned on to provide an alarm signal or trigger an alarm system.

It is to be understood that the drawings are designed for the purposes of illustration only, and are not intended as a definition of the limits and scope of the invention disclosed. And while there has been described what is believed to be the preferred embodiments of the present invention, those skilled in the art will recognize that the other and further modifications may be made thereto without departing from the spirit of the invention, and it is intended to claim all such changes and modifications as fall within the true scope of the invention.

What is claimed is:

1. A structure for an infrared photoelectric device comprising a casing covered with a face panel, said casing having a half-round recess;

an adjusting frame assembly mounted inside said casing, said adjusting frame assembly includes a connecting device, said connecting device includes a ball resting in said half-round recess of said casing and a square projecting rod extending from said ball, a locating plate fixed to the inside of said casing by fastening elements to hold down said ball of said connecting device in said half-round recess of said casing, said locating plate having a center hole passing therethrough in communication with said square projecting rod of said connecting device and a convex portion around said center hole and fitting over said ball, a rack having a square bottom recess coupled to said square projecting rod of said connecting device, a plurality of circuit board supports connected to and extending from said rack, and a plurality of lens mounting posts connected to and extending from said rack;

a circuit board attached to said plurality of circuit board supports, said circuit board having an infrared photoelectric element; and a lens disposed above said circuit board and attached to said plurality of lens mounting posts.

2. The structure for an infrared photoelectric device of claim 1, wherein said infrared photoelectric element is an emitter.

3. The structure for an infrared photoelectric device of claim 2, wherein said emitter is a light emitting diode.

4. The structure for an infrared photoelectric device of claim 2, wherein said emitter is a light emitting triode.

5. The structure for infrared photoelectric device of claim 2, wherein said emitter is a photodiode.

6. The structure for an infrared photoelectric device of claim 1, further comprising:

a recess on said casing, a switch mounted within said recess of said casing, said switch having a press button, said face panel having an opening passing therethrough for inserting the press button of said switch, and a cover board mounted over said face panel, said cover board pressing the press button of said switch to switch off said switch, said switch being switched on to turn on an alarm system when either power is interrupted to said circuit board or said cover board is removed from said casing.

7. The structure for an infrared photoelectric device of claim 6, wherein said infrared photoelectric element is an emitter.

8. The structure for an infrared photoelectric device of claim 7, wherein said emitter is a light emitting diode.

9. The structure for an infrared photoelectric device of claim 7, wherein said emitter is a light emitting triode.

10. The structure for infrared photoelectric device of claim 7, wherein said emitter is photodiode.

* * * * *